US010255477B2

(12) United States Patent
Lo et al.

(10) Patent No.: US 10,255,477 B2
(45) Date of Patent: *Apr. 9, 2019

(54) FEATURE-BASED MATCHER FOR DISTORTED FINGERPRINT MATCHING

(71) Applicant: MorphoTrack, LLC, Anaheim, CA (US)

(72) Inventors: Peter Zhen-Ping Lo, Mission Viejo, CA (US); Hui Chen, Foothill Ranch, CA (US)

(73) Assignee: MorphoTrak, LLC, Anaheim, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/609,293

(22) Filed: May 31, 2017

(65) Prior Publication Data

US 2017/0262681 A1   Sep. 14, 2017

Related U.S. Application Data

(63) Continuation of application No. 14/942,156, filed on Nov. 16, 2015, now Pat. No. 9,690,973.

(51) Int. Cl.
*G06K 9/00* (2006.01)
*G06T 7/00* (2017.01)

(52) U.S. Cl.
CPC ........... *G06K 9/001* (2013.01); *G06K 9/0008* (2013.01); *G06K 9/00046* (2013.01); *G06K 9/00067* (2013.01); *G06T 7/0002* (2013.01)

(58) Field of Classification Search
CPC .. G06K 9/001; G06K 9/00046; G06K 9/0008; G06F 17/3053; G06F 17/30271; G06T 7/0002

USPC ....... 382/100, 115, 125, 124, 154, 181, 209, 382/254, 260, 276, 302; 356/71
See application file for complete search history.

(56) References Cited

U.S. PATENT DOCUMENTS

| | | | |
|---|---|---|---|
| 4,135,147 A | 1/1979 | Riganati et al. | |
| 4,151,512 A * | 4/1979 | Riganati ................. | G06F 21/32 |
| | | | 382/125 |
| 4,646,352 A | 2/1987 | Asai et al. | |
| 4,790,564 A | 12/1988 | Larcher et al. | |

(Continued)

OTHER PUBLICATIONS

Chen et al., "A New Algorithm for Distorted Fingerprints Matching Based on Normalized Fuzzy Similarity Measure," IEEE Transactions on Image Processing, 2006, 15(3):767-776.

(Continued)

*Primary Examiner* — Sheela C Chawan
(74) *Attorney, Agent, or Firm* — Fish & Richardson P.C.

(57) ABSTRACT

In one aspect, methods that use a novel representation, referred to as an octant feature vector (OFV), are used for matching distorted fingerprints. For instance, a feature-based matcher for distorted fingerprint matching may use a two-step local and global matching scheme to compare a set of feature vectors that are derived from minutiae of a reference fingerprint and a search fingerprint. The relative geometric relationships between the reference minutia and nearest minutiae may be derived and encoded into a feature vector based on orientation difference. The OFV is invariant to the rigid transformations and is insensitive to nonlinear distortions since the relative geometric relationships are independent from the rigid transformation.

20 Claims, 9 Drawing Sheets

(56) References Cited

U.S. PATENT DOCUMENTS

| | | | |
|---|---|---|---|
| 4,817,183 A | | 3/1989 | Sparrow |
| 5,613,014 A | | 3/1997 | Eshera et al. |
| 5,631,972 A | | 5/1997 | Ferris et al. |
| 5,659,626 A | * | 8/1997 | Ort .................... G06K 9/00067 382/125 |
| 6,546,122 B1 | | 4/2003 | Russo |
| 6,778,685 B1 | | 8/2004 | Jiang |
| 6,941,003 B2 | | 9/2005 | Ziesig |
| 7,099,498 B2 | | 8/2006 | Lo |
| 7,489,807 B2 | * | 2/2009 | Hwang ................ G06K 9/0008 382/124 |
| 9,690,973 B2 | * | 6/2017 | Lo .......................... G06K 9/001 |
| 2015/0286855 A1 | | 10/2015 | Neskovic |

OTHER PUBLICATIONS

He et al., "Fingerprint Matching Based on Global Comprehensive Similarity," IEEE Transactions on Pattern Analysis and Machine Intelligence, 2006, 28(6):850-862.

Jain et al., "On-line fingerprint verification", IEEE Transactions on Pattern Analysis and Machine Intelligence, 1997, 19(4):302-313.

Zhu et al., "Fingerprint Matching Based on Global Alignment of Multiple Reference Minutiae," Pattern Recognition, 2005, 38(10):1685-1694.

\* cited by examiner

FINGERPRINT ALIGNMENT

MINUTIAE MATCHING

DISTORTED
FINGERPRINT MATCHING

FEATURE-BASED MATCHER FOR DISTORTED FINGERPRINT MATCHING

FIELD

The present disclosure relates generally to fingerprint identification systems.

BACKGROUND

Pattern matching systems such as ten-print or fingerprint matching systems play a critical role in criminal and civil applications. For example, fingerprint identification is often used for identify and track suspects and in criminal investigations. Similarly, fingerprint verification is used in in civil applications to prevent fraud and support other security processes.

SUMMARY

In general, the matching of distorted fingerprints pose several challenges to fingerprint identification and matching technologies. For instance, distortions can impact matching accuracy because the distortions may change both the geometric locations and orientations of individual minutiae.

Accordingly, one innovative aspect of the subject matter described throughout this specification involves methods that use a novel representation, referred to as an octant feature vector (OFV), for matching distorted fingerprints. For instance, a feature-based matcher for distorted fingerprint matching may use a two-step local and global matching scheme to compare a set of feature vectors that are derived from minutiae of a reference fingerprint and a search fingerprint. The relative geometric relationships between the reference minutia and nearest minutiae may be derived and encoded into a feature vector based on orientation difference. The OFV is invariant to the rigid transformations and is insensitive to nonlinear distortions since the relative geometric relationships are independent from the rigid transformation. The OFVs that are generated for individual minutiae may be compared to compute a similarity between the reference and search fingerprint.

Implementations may include one or more of the following features. For example, a method for matching distorted fingerprints, said method implemented by an automatic fingerprint identification system including a processor, a memory coupled to the processor, an interface to a fingerprint scanning device, and a sensor associated with the fingerprint scanning device that indicates a fingerprint match. The method may include: receiving (i) a plurality of search octant feature vectors associated with a plurality of search minutiae extracted from a search fingerprint, and (ii) a plurality of reference octant feature vectors associated with a plurality of reference minutiae extracted from a reference fingerprint, where the search fingerprint includes one or more non-overlapping sectors that each include a subset of the plurality of search minutiae, and each of the plurality of search octant feature vectors includes a set of relative features that represent a difference between a particular search minutia and a plurality of particular reference minutiae that are identified as closest neighboring minutiae within a particular sector that includes the particular search minutiae, and each of the plurality of reference octant feature vectors includes a set of relative features that represent a difference between a particular reference minutia and a plurality of particular search minutiae that are identified as closest neighboring minutiae within a particular sector that includes the particular search minutiae;

The computer-implemented method may include: computing, for each of the plurality of search minutiae, a first score that (i) represents the difference between the particular search octant feature associated with the particular search minutia and the plurality of reference octant feature vectors associated with a plurality of particular reference minutiae that are identified as closest neighboring minutiae within the particular sector that includes the particular search minutiae, and (ii) is adjusted based at least on determining that at least one of the plurality of particular reference minutiae that are identified as the closest neighboring minutiae within the particular sector that includes the particular search minutia has drifted to another of the one or more sectors due to distortion within the search fingerprint.

The computer-implemented method may include: computing, for each of the plurality of search minutiae, a second score that represents a ratio indicating a number of paired mated minutiae relative to a number of paired unmated minutiae all of the one or more sectors, where: the paired mated minutiae represent the particular search minutia that have the plurality of particular reference minutiae that are identified as closest neighboring minutiae within each of the one or more sectors, and the paired unmated minutiae represent the particular search minutia that do not have at least one particular reference minutia that is identified as the closest neighboring minutiae within each of the one or more sectors.

The computer-implemented method may include: computing, for each of the plurality of search minutiae, a local similarity score based at least on combining the first score and the second score; determining, based at least on the computed local similarity scores for each of the plurality of search minutiae, (i) a geometrically aligned region between the search fingerprint and the reference fingerprint, and (ii) a rotation angle between the search fingerprint and the reference fingerprint; and identifying a plurality of globally aligned mated minutiae within the geometrically aligned region, where the plurality of globally aligned mated minutiae represent a set of particular search minutia that have geometrically consistent features, determined based at least on the rotation angle, to a plurality of particular reference minutiae within the geometrically aligned region.

The computer-implemented method may include: computing, for each of the plurality of globally aligned mated minutiae, an additional first score that represents the difference between a particular search octant feature associated with the particular search minutia within the geometrically aligned region and a plurality of reference octant feature vectors associated with the plurality of particular reference minutiae within the geometrically aligned region; and computing, for each of the plurality of globally aligned mated minutiae, an additional second score that represents a ratio indicating a number of paired globally aligned mated minutiae relative to a number of globally aligned unmated minutiae within geometrically aligned region.

The computer-implemented method may include: computing (i) a third score based at least on combining the respective first scores for each of the plurality of search minutiae, and the respective additional first scores for each of the plurality of globally aligned mated minutiae, (ii) a fourth score based at least on combining the respective second scores for each of the plurality of search minutiae, and the respective additional second scores for each of the plurality of globally aligned mated minutiae; computing a match similarity score between the search fingerprint and the reference fingerprint based at least on combining the third score and the fourth score; and providing the match similarity score for output to the automatic fingerprint identification system.

Other versions include corresponding systems, and computer programs, configured to perform the actions of the methods encoded on computer storage devices.

One or more implementations may include the following optional features. For example, in some implementations, combining the third score and the fourth score includes adding the values of the respective scores.

In some implementations, identifying the plurality of globally aligned mated minutiae within the geometrically aligned region includes: obtaining a plurality of local closest matched minutia pairs based on a plurality of top matched local similarity scores; and computing a plurality sets of rotation parameters based on the plurality of the local closest matched minutia pairs.

In some implementations, identifying the plurality of globally aligned mated minutiae within the geometrically aligned region includes: computing (i) a set of rotation parameters, and (ii) a set of translation parameters, based on the plurality of globally aligned mated minutiae within the geometrically aligned region; and aligning the search minutiae to the reference minutiae based at least on set of rotation parameters and the set of translation parameters.

In some implementations, computing the plurality sets of rotation parameters includes: identifying a plurality of angles corresponding to a plurality of top bins of an angle offset histogram of the plurality of the local closest matched minutiae pairs.

In some implementations, prior to identifying the plurality of angles, generating the angle offset histogram of the plurality local matched minutia pairs using a smoothing process.

In some implementations, identifying the plurality of globally aligned mated minutiae within the geometrically aligned region includes: applying a two-stage pruning procedure to perform local and global pairing operations on the local matched minutia pairs.

In some implementations, the local and global pairing operations are performed using a plurality of rotations and the plurality of top closest matched minutia pairs to remove: a subset of the plurality of globally aligned mated minutiae that are identified to not be the local closest matched pairs, a subset of the plurality of globally aligned mated minutiae with lower local similarity scores within a same index, or a subset of the plurality of globally aligned mated minutiae with transformed pairs for the corresponding rotations that do not yield the highest cumulative local similarity scores.

In some implementations, the match similarity score is used to determine a fingerprint match between the search fingerprint and the reference fingerprint, where the search fingerprint is a distorted fingerprint.

In some implementations, the computer-implemented method includes determining, within a particular fingerprint identification operation, a match between the search fingerprint and the reference fingerprint based at least on the value of the match similarity score.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

In general, the matching of distorted fingerprints pose several challenges to fingerprint identification and matching technologies. For instance, distortions can impact matching accuracy because the distortions may change both the geometric locations and orientations of individual minutiae.

System Architecture

Figure 1A:
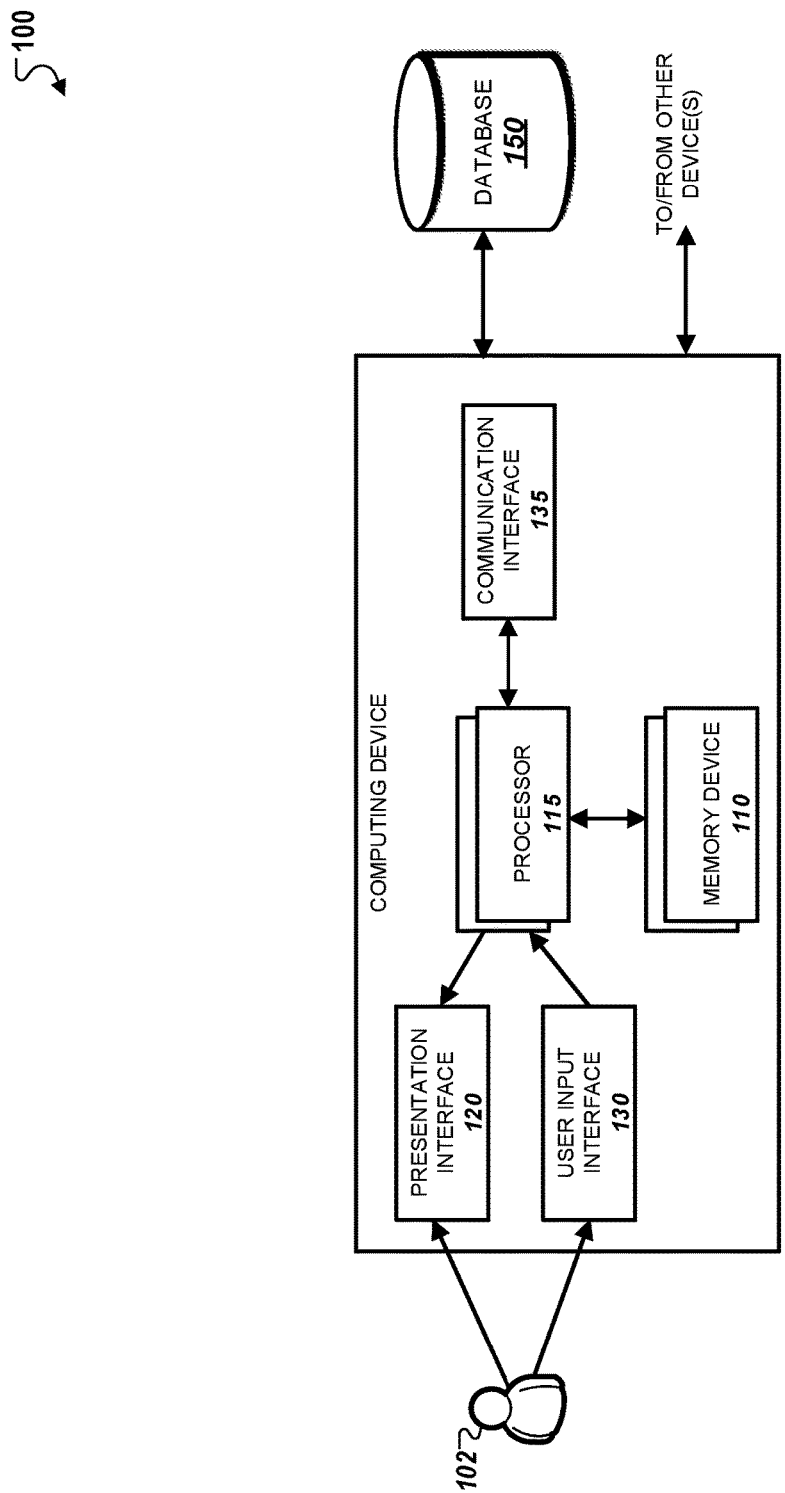
FIG. 1A is a block diagram of an exemplary automatic fingerprint identification system.

FIG. 1 is a block diagram of an exemplary automatic fingerprint identification system 100. Briefly, the automatic fingerprint identification system 100 may include a computing device including a memory device 110, a processor 115, a presentation interface 120, a user input interface 130, and a communication interface 135. The automatic fingerprint identification system 100 may be configured to facilitate and implement the methods described through this specification. In addition, the automatic fingerprint identification system 100 may incorporate any suitable computer architecture that enables operations of the system described throughout this specification.

The processor 115 may be operatively coupled to memory device 110 for executing instructions. In some implementations, executable instructions are stored in the memory device 110. For instance, the automatic fingerprint identification system 100 may be configurable to perform one or more operations described by programming the processor 115. For example, the processor 115 may be programmed by encoding an operation as one or more executable instructions and providing the executable instructions in the memory device 110. The processor 115 may include one or more processing units, e.g., without limitation, in a multi-core configuration.

The memory device 110 may be one or more devices that enable storage and retrieval of information such as executable instructions and/or other data. The memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

The memory device 110 may be configured to store a variety of data including, for example, matching algorithms, scoring algorithms, scoring thresholds, perturbation algorithms, fusion algorithms, virtual minutiae generation algorithms, minutiae overlap analysis algorithms, and/or virtual minutiae analysis algorithms. In addition, the memory device 110 may be configured to store any suitable data to facilitate the methods described throughout this specification.

The presentation interface 120 may be coupled to processor 115. For instance, the presentation interface 120 may present information, such as a user interface showing data related to fingerprint matching, to a user 102. For example, the presentation interface 120 may include a display adapter (not shown) that may be coupled to a display device (not shown), such as a cathode ray tube (CRT), a liquid crystal display (LCD), an organic LED (OLED) display, and/or a hand-held device with a display. In some implementations, the presentation interface 120 includes one or more display devices. In addition, or alternatively, the presentation interface 120 may include an audio output device (not shown), e.g., an audio adapter and/or a speaker.

The user input interface 130 may be coupled to the processor 115 and receives input from the user 102. The user input interface 130 may include, for example, a keyboard, a pointing device, a mouse, a stylus, and/or a touch sensitive panel, e.g., a touch pad or a touch screen. A single component, such as a touch screen, may function as both a display device of the presentation interface 120 and the user input interface 130.

In some implementations, the user input interface 130 may represent a fingerprint scanning device that is used to capture and record fingerprints associated with a subject (e.g., a human individual) from a physical scan of a finger, or alternately, from a scan of a latent print. In addition, the user input interface 130 may be used to create a plurality of reference records.

A communication interface 135 may be coupled to the processor 115 and configured to be coupled in communication with one or more other devices such as, for example, another computing system (not shown), scanners, cameras, and other devices that may be used to provide biometric information such as fingerprints to the automatic fingerprint identification system 100. Such biometric systems and devices may be used to scan previously captured fingerprints or other image data or to capture live fingerprints from subjects. The communication interface 135 may include, for example, a wired network adapter, a wireless network adapter, a mobile telecommunications adapter, a serial communication adapter, and/or a parallel communication adapter. The communication interface 135 may receive data from and/or transmit data to one or more remote devices. The communication interface 135 may be also be web-enabled for remote communications, for example, with a remote desktop computer (not shown).

The presentation interface 120 and/or the communication interface 135 may both be capable of providing information suitable for use with the methods described throughout this specification, e.g., to the user 102 or to another device. In this regard, the presentation interface 120 and the communication interface 135 may be used to as output devices. In other instances, the user input interface 130 and the communication interface 135 may be capable of receiving information suitable for use with the methods described throughout this specification, and may be used as input devices.

The processor 115 and/or the memory device 110 may also be operatively coupled to the database 150. The database 150 may be any computer-operated hardware suitable for storing and/or retrieving data, such as, for example, pre-processed fingerprints, processed fingerprints, normalized fingerprints, extracted features, extracted and processed feature vectors such as octant feature vectors (OFVs), threshold values, virtual minutiae lists, minutiae lists, matching algorithms, scoring algorithms, scoring thresholds, perturbation algorithms, fusion algorithms, virtual minutiae generation algorithms, minutiae overlap analysis algorithms, and virtual minutiae analysis algorithms.

The database 150 may be integrated into the automatic fingerprint identification system 100. For example, the automatic fingerprint identification system 100 may include one or more hard disk drives that represent the database 150. In addition, for example, the database 150 may include multiple storage units such as hard disks and/or solid state disks in a redundant array of inexpensive disks (RAID) configuration. In some instances, the database 150 may include a storage area network (SAN), a network attached storage (NAS) system, and/or cloud-based storage. Alternatively, the database 150 may be external to the automatic fingerprint identification system 100 and may be accessed by a storage interface (not shown). For instance, the database 150 may be used to store various versions of reference records including associated minutiae, octant feature vectors (OFVs) and associated data related to reference records.

Feature Extraction

In general, feature extraction describes the process by which the automatic fingerprint detection system 100 extracts a list of minutiae from each of reference fingerprint, and the search fingerprint. As described, a "minutiae" represent major features of a fingerprint, which are used in comparisons of the reference fingerprint to the search fingerprint to determine a fingerprint match. For example, common types of minutiae may include, for example, a ridge ending, a ridge bifurcation, a short ridge, an island, a ridge enclosure, a spur, a crossover or bridge, a delta, or a core.

Figure 1B:
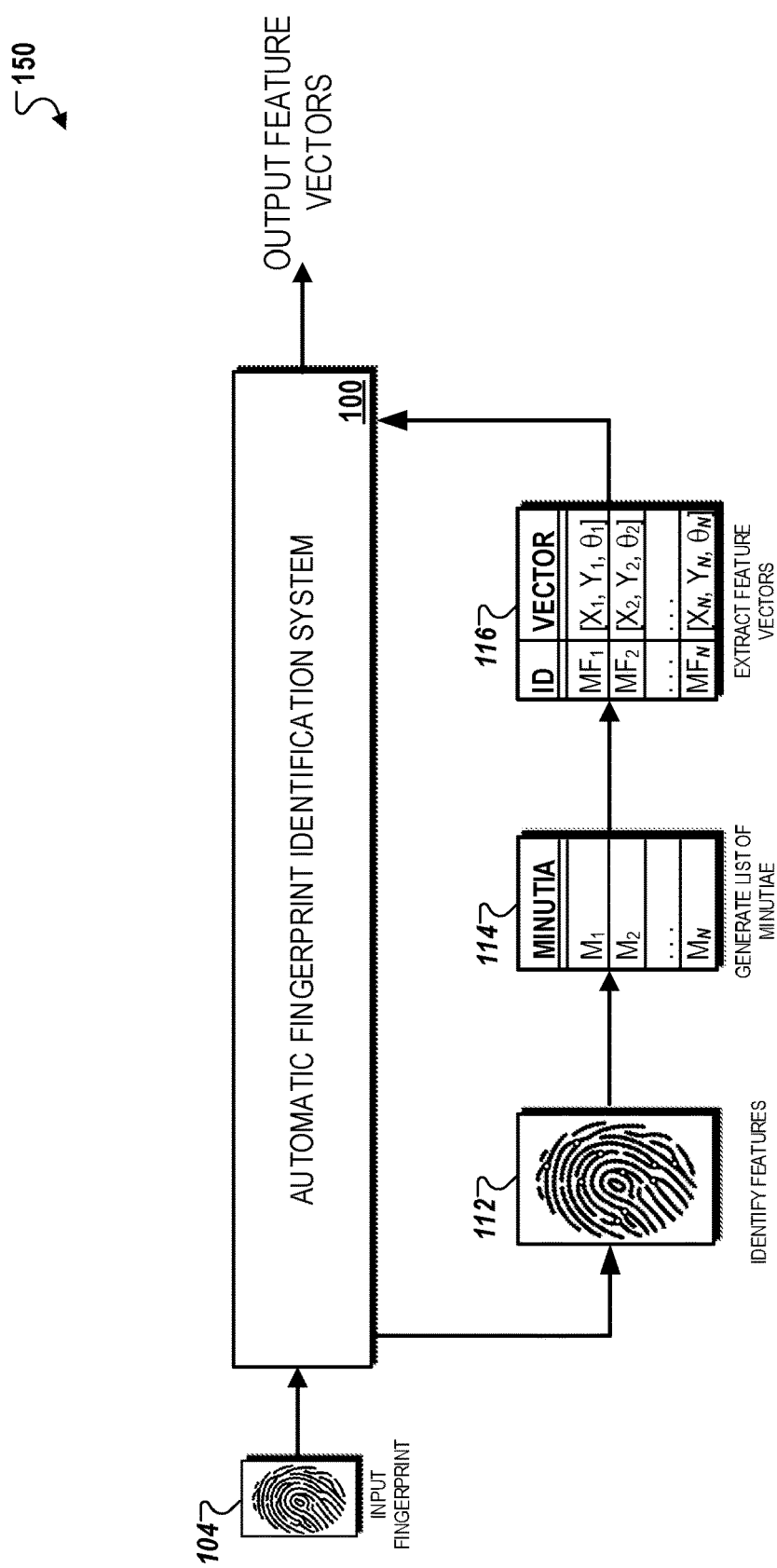
FIG. 1B is a block diagram of an exemplary feature extraction process.

FIG. 1B is a block diagram of an exemplary feature extraction process 150. As shown, after receiving an input fingerprint 104, the automatic fingerprint detection system 100 initially identifies a set of features 112 within the fingerprint, generates a list of minutiae 114, and extracts a set of feature vectors 116. For instance, the automatic fingerprint detection system 100 may generate a list of minutia 114 for each of the reference fingerprint (or "reference record") and a search fingerprint (or "search record").

In some implementations, the feature vectors 116 may be described using feature vector that is represented by $Mf_i=(x_i, y_i, \theta_i)$. As described, the feature vector $Mf_i$ includes a minutia location that is defined by coordinate geometry such as $(x_i, y_i)$, and a minutiae direction that is defined by the angle $\theta_i \in [0, 2\pi]$. In other examples, further minutiae characteristics such as, quality, ridge frequency, and ridge curvature may also be used to describe feature vector $Mf_i$. The extracted feature vectors may be used to generate octant feature vectors (OFVs) for each of identified minutia within the search and reference fingerprints.

Octant Feature Vector (OFV) Overview

The automatic fingerprint identification system 100 may compare the search and reference records based on initially generating feature vectors associated with minutiae that are extracted from the search and reference records, respectively. For instance, as described throughout this specification, in some implementations, octant feature vectors (OFVs) may be used to as feature vectors that define attributes of the extracted minutiae. However, in other implementations, other minutiae descriptors may be used.

OFVs encode geometric relationships between reference minutiae and the nearest neighboring minutiae to the reference minutiae in a particular sector (referred to as the "octant neighborhood") of the octant. Each sector of the octant used in an OFV spans 45 degrees of a fingerprint region. The nearest neighboring minutiae may be assigned to one sector of the octant based on their orientation difference. The geometric relationship between a reference minutia and its nearest minutia in each octant sector may be described by relative features including, for example, distance between the minutiae and the orientation difference between minutiae. The representation achieved by the use of an OFV is invariant to transformation. In addition, this representation is insensitive to a nonlinear distortion because the relative features are independent from any transformation.

Pairs of reference minutiae and nearest neighboring minutiae may be identified as "mated minutiae pairs." The mated minutiae pairs in a reference record and a search record may be identified by comparing the respective OFVs of minutiae extracted from the reference record and the search record. The transformation parameters may be estimated by comparing attributes of the corresponding mated minutiae. For example, the transformation parameters may indicate the degree to which the search record has been transformed (e.g., perturbed or twisted) as relative to a particular reference record. In other examples, the transformation parameters may be applied to verify that, for a particular pair of a reference record and a search record (a "potential matched fingerprint pair"), mated minutiae pairs exhibit corresponding degrees of transformation. Based on the amount of corresponding mated minutiae pairs in each potential matched fingerprint pair, and the consistency of the transformation, a similarity score may be assigned. In some implementations, the pair of potential matched fingerprint pairs with the highest similarity score may be determined as a candidate matched fingerprint pair.

The automatic fingerprint identification system 100 may calculate an OFV for each minutia that encodes the geometric relationships between the reference minutia and its nearest minutiae in each sector of the octant. For instance, the automatic fingerprint identification system 100 may define eight octant sectors and assigns the nearest minutiae to one sector of the octant based on the location of each minutiae within the sectors. The geometric relationship between a reference minutia and its nearest minutia in each octant sector is represented by the relative features. For example, in some implementations, the OFV encodes the distance, the orientation difference, and the ridge count difference between the reference feature and the nearest neighbor features. Because the minutia orientation can flexibly change up to 45° due to the octant sector approach, relative features are independent from any transformation.

The automatic fingerprint identification system 100 may use the OFVs to determine the number of possible corresponding minutiae pairs. Specifically, the automatic fingerprint identification system 100 may evaluate the similarity between two respective OFVs associated with the search record and the file record. The automatic fingerprint identification system 100 may identify all possible local matching areas of the compared fingerprints by comparing the OFVs. The automatic fingerprint identification system 100 may also an individual similarity score for each of the mated OFV pairs.

The automatic fingerprint identification system 100 may clusters all OFVs of the matched areas with similar transformation effects (e.g., rotation and transposition) into an associated similar bin. Note that the precision of the clusters of the bins (e.g., the variance of the similar rotations within each bin) is a proxy for the precision of this phase. Automatic fingerprint identification system 100 therefore uses bins with higher numbers of matched OFVs (e.g., clusters with the highest counts of OFVs) for the first phase global alignment.

The automatic fingerprint identification system 100 may use the location and angle of each selected bin as the parameters of a reference point (an "anchor point") to perform a global alignment procedure. More specifically, the automatic fingerprint identification system 100 may identify the global alignment based on the bins that include the greatest number of the global mated minutiae pairs, and the location and angle associated with each of those bins. Based on the number of global paired minutiae found and the total of individual similarity scores calculated for the corresponding OFVs within the bin or bins, the automatic fingerprint identification system 100 may identify the transformations (e.g., the rotations of the features) with the best alignment.

In a second phase, the automatic fingerprint identification system 100 performs a more precise pairing using the transformations with the best alignment to obtain a final set of the globally aligned minutiae pairs. In this phase, automatic fingerprint identification system 100 performs a pruning procedure to find geometrically consistent minutiae pairs with tolerance of distortion for each aligned minutiae set that factors in the local and global geometrical index consistency. By performing such alignment globally and locally, automatic fingerprint identification system 100 determines the best set of global aligned minutiae pairs. Automatic fingerprint identification system 100 uses the associated miniscores of the global aligned pairs to calculate the global similarity score. Furthermore, automatic fingerprint identification system 100 factors in a set of absolute features of the minutiae, including the quality, ridge frequency, and the curvatures in the computation of the final similarity score.

OFV Generation

The automatic fingerprint identification system 100 may generate an octant feature vector (OFV) for each minutia of the features extracted. Specifically, as described above, the automatic fingerprint identification system 100 may generate OFVs encoding the distance and the orientation difference between the reference minutiae and the nearest neighbor in each of eight octant sectors. Alternately, the automatic fingerprint identification system 100 may generate feature vectors with different numbers of sectors.

Figure 2:
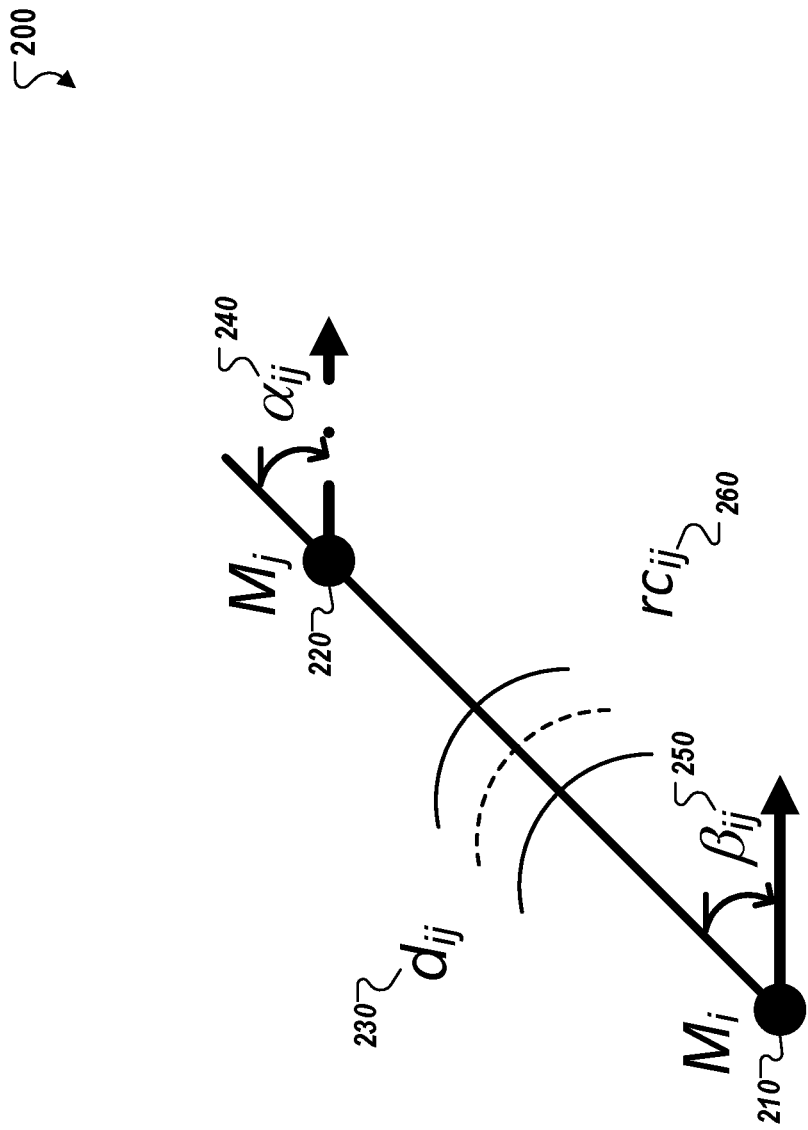
FIG. 2 is an exemplary illustration of geometric relationships between a reference minutia and a neighboring minutia.

FIG. 2 is an exemplary illustration 200 of geometric relationships between a reference minutia 210 and a neighboring minutia 220. The geometric relationships may be used to construct a rotation and translation invariant feature vector that includes relative attributes ($d_{ij}$, $\alpha_{ij}$, $\beta_{ij}$) between the reference minutia 210 and the neighboring minutia 220.

As depicted in FIG. 2, the automatic fingerprint identification system 100 may compute a Euclidean distance 230 between the reference minutia 210 and the neighboring minutia 220, a minimum rotation angle 240 for the neighboring minutia, and a minimum rotation angle 250 for the reference minutia 210. In addition, the automatic fingerprint identification system may compute a ridge count 260 across the reference minutia 210 and the neighboring minutia 220.

Specifically, the rotation and translation invariant feature vector may be represented as vector 1 (represented below). In some implementations, an OFV is created to describe the geometric relationship between. Further, $M_i$ represents a reference minutia and $M_j$ represents a nearest neighbor minutiae in one of the octant sectors. The OFV for each sector may be described in the given vector from vector 1:

Vector 1: ($d_{ij}$, $\alpha_{ij}$, $\beta_{ij}$), where $d_{ij}$ denotes the Euclidean distance 230, where $\alpha=\lambda(\theta_i, \theta_j)$ denotes the minimum rotation angle 240 required to rotate a line of direction $\theta_i$ in a particular direction (e.g., counterclockwise in FIG. 2) to make the line parallel with a line of direction $\theta_j$, and where $\beta_{ij}=\lambda(\theta_i, \angle(M_i, M_j))$ denotes the minimum rotation angle 250, where $\angle(M_i, M_j)$ denotes the direction from the reference minutia 210 to the neighboring minutia 220, and where $\lambda(a,b)$ denotes the same meaning as defined in $\alpha_{ij}$ Specifically, because each element calculated in the feature vector is a relative measurement between the reference minutia 210 and the neighboring minutia 220, the feature vector is independent from the rotation and translation of the fingerprint. Elements 230, 240, and 250 may be referred to as relative features and are used to compute the similarity between pair of reference minutia 210 and the neighboring minutia 220. In some implementations, other minutiae features such as absolute features may additionally or alternatively be used by the automatic fingerprint identification system 100 to weight the computed similarity score between a pair of mated minutiae that includes reference minutia 210 and the neighboring minutia 220.

Figure 3:
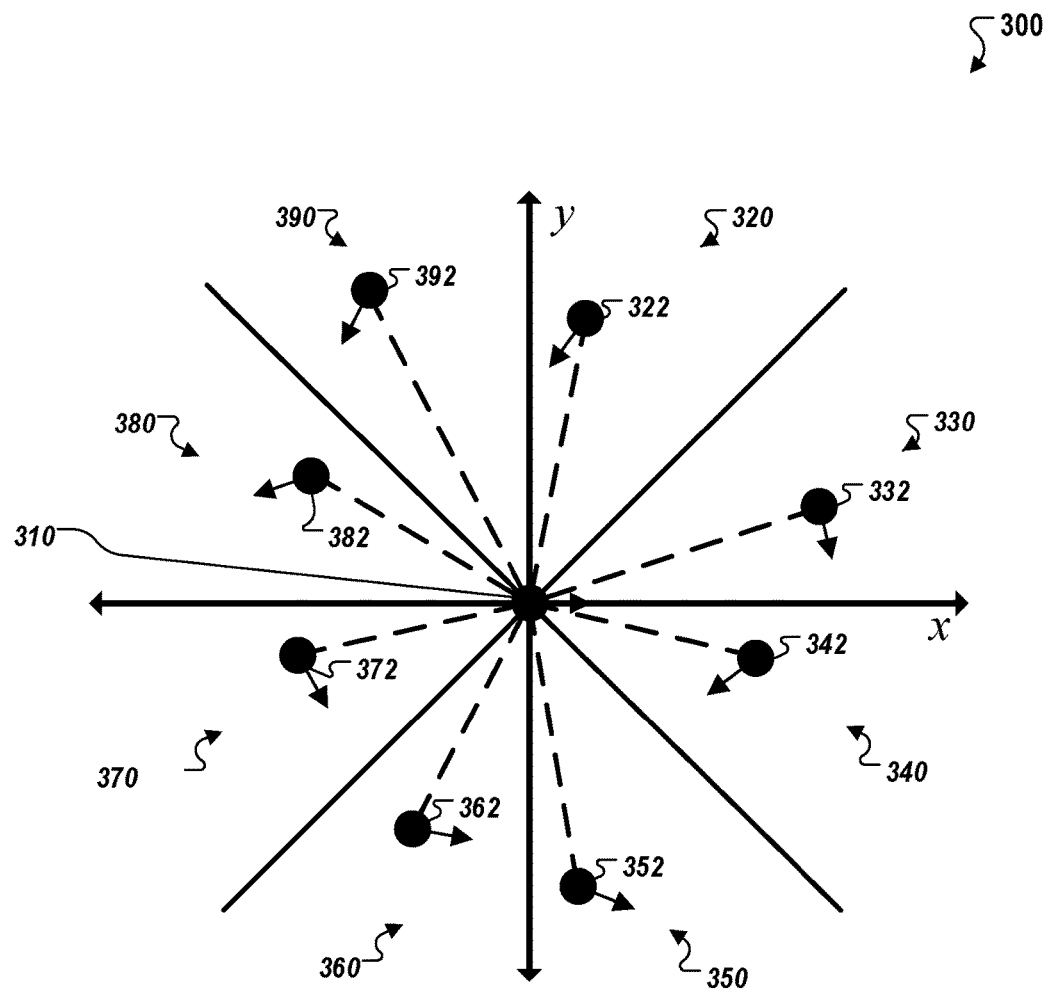
FIG. 3 is a graphical illustration of the relationships represented in an exemplary octant feature vector (OFV).

FIG. 3 is a graphical illustration of the relationships represented in an exemplary octant feature vector (OFV) 300. The OFV 300 may be generated for a reference minutia 310, which corresponds to the reference minutia 210 as shown in FIG. 2. As shown, the OFV 300 represents relationships between the reference minutiae 310 and its nearest neighboring minutiae 322, 332, 342, 352, 362, 372, 382, and 392 in sectors 320, 330, 340, 350, 360, 370, 380, and 390, respectively. However, the graphical illustration of OFV 300 does not depict the details of the geographic relationships, which are described within respect to FIG. 2. Although FIG. 3 indicates a neighboring minutia within each octant sector, in some instances, there may be no neighboring minutiae within a particular sector. In such instances, the OFV for the particular sector without a neighboring minutia is set to zero. Otherwise, because the neighboring minutiae 322, 332, 342, 352, 362, 372, 382, and 392 may not overlap with reference minutiae 310, the OFV is greater than zero.

Figure 4:
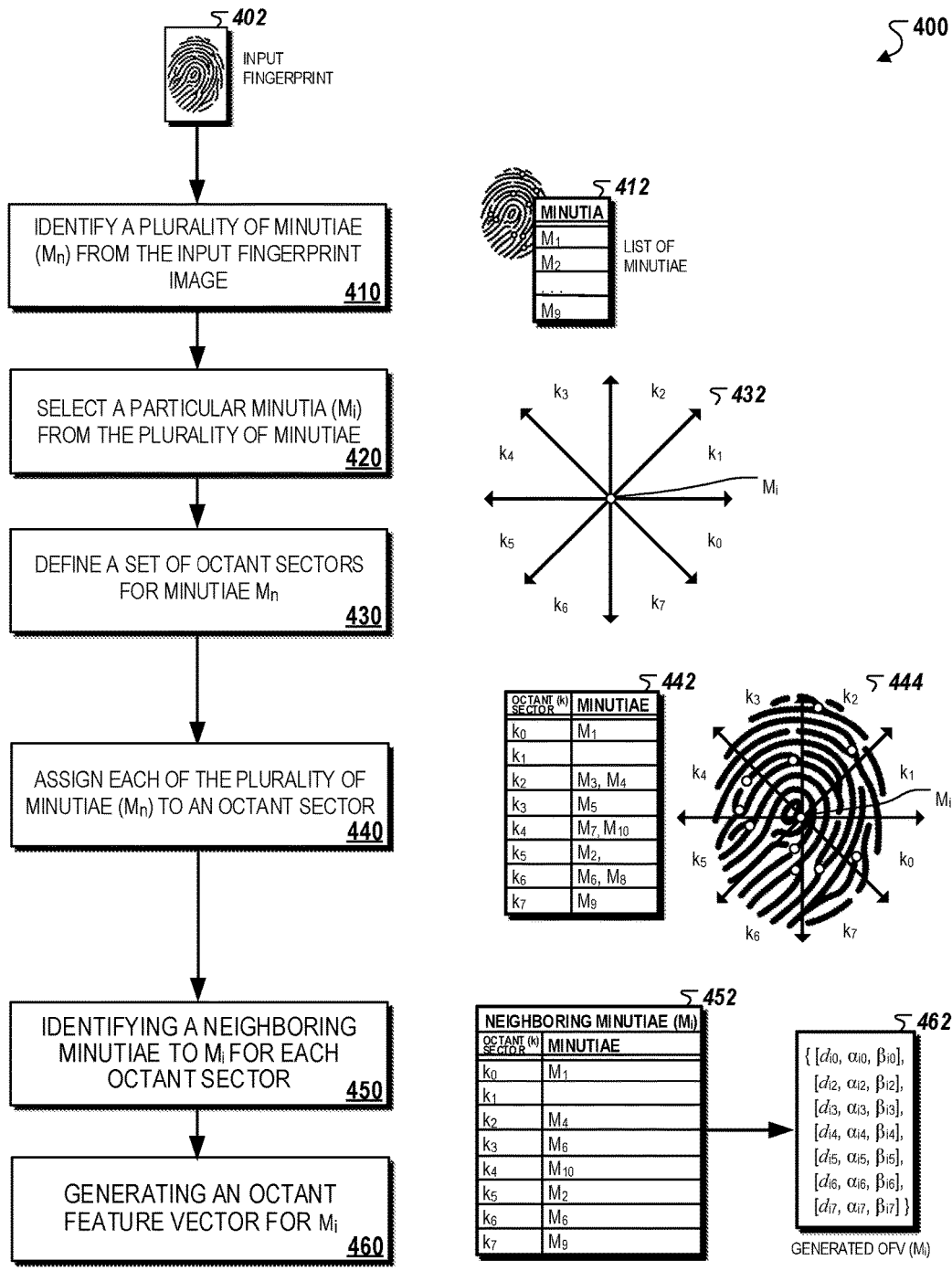
FIG. 4 is an exemplary process of generating an octant feature vector (OFV).

FIG. 4 is an exemplary process 400 of generating an octant feature vector (OFV). Briefly, the process 400 may include identifying a plurality of minutiae from the input fingerprint image (410), selecting a particular minutia from the plurality of minutiae (420), defining a set of octant sectors for the plurality of minutiae (430), assigning each of the plurality of minutiae to an octant sector (440), identifying a neighboring minutiae to the particular minutia for each octant sector (450), and generating an octant feature vector for the particular minutia (460).

In more detail, the process 400 may include the process may include identifying a plurality of minutiae from the input fingerprint image (410). For instance, the automatic fingerprint identification system 100 may receive the input fingerprint 402 and generate a list of minutiae 412 using the techniques described previously with respect to FIG. 1B.

The process 400 may include selecting a particular minutia from the plurality of minutiae (420). For instance, the automatic fingerprint identification system 100 may select a particular minutia within the list of minutiae 412.

The process 400 may include defining a set of octant sectors for the plurality of minutiae (430). For instance, the automatic fingerprint identification system 100 may generate a set of octant sectors 432 that include individual octant sectors $k_0$ to $k_7$ as shown in FIG. 4. The set of octant sectors 432 may be generated in reference to the particular minutia that is selected in step 420.

The process 400 may include assigning each of the plurality of minutiae to an octant sector (440). For instance, the automatic fingerprint identification system 100 may assign each of the plurality of minutiae from the list of minutiae 412 into corresponding octant sectors within the set of octant sectors 432. The assigned minutiae may be associated with the corresponding octant sectors in a list 442 that includes the number of minutiae that are identified within each individual octant sector. For example, as shown in FIG. 4, the exemplary octant sector $k_1$ has no identified minutiae, whereas the exemplary $k_6$ includes two identified minutiae within the octant sector. The graphical illustration 444 represents the locations of the plurality of minutiae, relative to the particular selected minutia, $M_i$, within the individual octant sectors.

The process 400 may include identifying a neighboring minutiae to the particular minutia for each octant sector (450). For instance, the automatic fingerprint identification system 100 may identify, from all the neighboring minutiae within each octant sector, the neighboring minutia that is the closest neighboring minutia based on the distance between each neighboring minutia and the particular selected minutia, $M_i$. For example, for the octant sector $k_6$, the automatic fingerprint identification system 100 may determine that the minutia, $M_6$ is the closest neighboring minutia based on the distance between $M_i$ and $M_6$. The closest neighboring minutiae for all of the octant sectors may be aggregated within a list of closest neighboring minutiae 452 that identifies each of the closest neighboring minutiae.

The process 400 may include generating an octant feature vector for the particular minutia (460). For instance, the automatic fingerprint identification system 100 may generate an octant feature vector 462, based on the list of closest neighboring minutiae 452, which includes a set of relative features such as the Euclidean distance 230, the minimum rotation angle 240, and the minimum rotation angle 250 as described previously with respect to FIG. 2.

As described above with respect to FIGS. 2-4, OFVs for minutiae may be used to characterize local relationships with neighboring minutiae, which are invariant to the rotation and translation of the fingerprint that includes the minutiae. The OFVs are also insensitive to distortion, since the nearest neighboring minutiae are assigned to multiple octant sectors in various directions, thereby allowing flexibility of orientation of up to 45°. In this regard, the OFVs of minutiae within a fingerprint may be compared against the OFVs of minutiae within another fingerprint (e.g., a search fingerprint) to determine a potential match between the two fingerprints. Descriptions of the general fingerprint matching process, and the OFV matching process are provided below.

Fingerprint Identification and Matching

In general, the automatic fingerprint identification system 100 may perform fingerprint identification and matching in two stages: (1) an enrollment stage, and (2) an identification/verification stage.

In the enrollment stage, an individual (or a "registrant") has their fingerprints and personal information enrolled. The registrant may be an individual manually providing their fingerprints for scanning or, alternately, an individual whose fingerprints were obtained by other means. In some examples, registrants may enroll fingerprints using latent prints, libraries of fingerprints, and any other suitable repositories and sources of fingerprints. As described, the process of "enrolling" and other related terms refer to providing biometric information (e.g., fingerprints) to an identification system (e.g., the automatic fingerprint identification system 100).

The automatic fingerprint identification 100 system may extract features such as minutiae from fingerprints. As described, "features" and related terms refer to characteristics of biometric information (e.g., fingerprints) that may be used in matching, verification, and identification processes. The automatic fingerprint identification system 100 may create a reference record using the personal information and the extracted features, and save the reference record into the database 150 for subsequent fingerprint matching, verification, and identification processes.

In some implementations, the automatic fingerprint identification system 100 may contain millions of reference records. As a result, by enrolling a plurality of registrants (and their associated fingerprints and personal information), the automatic fingerprint identification system 100 may create and store a library of reference records that may be used for comparison to search records. The library may be stored at the database 150 associated.

In the identification stage, the automatic fingerprint identification system 100 may use the extracted features and personal information to generate a record known as a "search record". The search record represents a source fingerprint for which identification is sought. For example, in criminal investigations, a search record may be retrieved from a latent print at a crime scene. The automatic fingerprint identification may compare the search record with the enrolled reference records in the database 150. For example, during a search procedure, a search record may be compared against the reference records stored in the database 150. In such an example, the features of the search record may be compared to the features of each of the plurality of reference records. For instance, minutiae extracted from the search record may be compared to minutiae extracted from each of the plurality of reference records.

As described, a "similarity score" is a measurement of the similarity of the fingerprint features (e.g., minutiae) between the search record and each reference record, represented as a numerical value to degree of similarity. For instance, in some implementations, the values of the similarity score may range from 0.0 to 1.0, where a higher magnitude represents a greater degree of similarity between the search record and the reference record.

The automatic fingerprint identification system 100 may compute individual similarity scores for each comparison of features (e.g., minutiae), and aggregate similarity scores (or "final similarity scores") between the search record to each of the plurality of reference records. In this regard, the automatic fingerprint identification system 100 may generate similarity scores of varying levels of specificity throughout the matching process of the search record and the plurality of reference records.

The automatic fingerprint identification system 100 may also sort each of the individual similarity scores based on the value of the respective similarity scores of individual features. For instance, the automatic identification system 100 may compute individual similarity scores between respective minutiae between the search fingerprint and the reference fingerprint, and sort the individual similarity scores by their respective values.

A higher final similarity score indicates a greater overall similarity between the search record and a reference record while a lower final similarity score indicates a lesser over similarity between the search record and a reference record.

Therefore, the match (e.g., the relationship between the search record and a reference record) with the highest final similarity score is the match with the greatest relationship (based on minutiae comparison) between the search record and the reference record.

Minutiae and OFV Matching

In general, the OFVs of minutiae may be compared between two fingerprints to determine a potential match between a reference fingerprint and a search fingerprint. The automatic fingerprint identification system 100 may compare the OFVs of corresponding minutiae from the reference fingerprint and the search fingerprint to compute an individual similarity score that reflects a confidence that the particular reference minutiae corresponds to the particular search minutiae that is being compared to. The automatic fingerprint identification system 100 may then compute aggregate similarity scores, between a list of reference minutiae and a list of search minutiae, based the values of the individual similarity scores for each minutiae. For instance, as described more particularly below, various types of aggregation techniques may be used to determine the aggregate similarity scores between the reference fingerprint and the search fingerprint.

Figure 5:
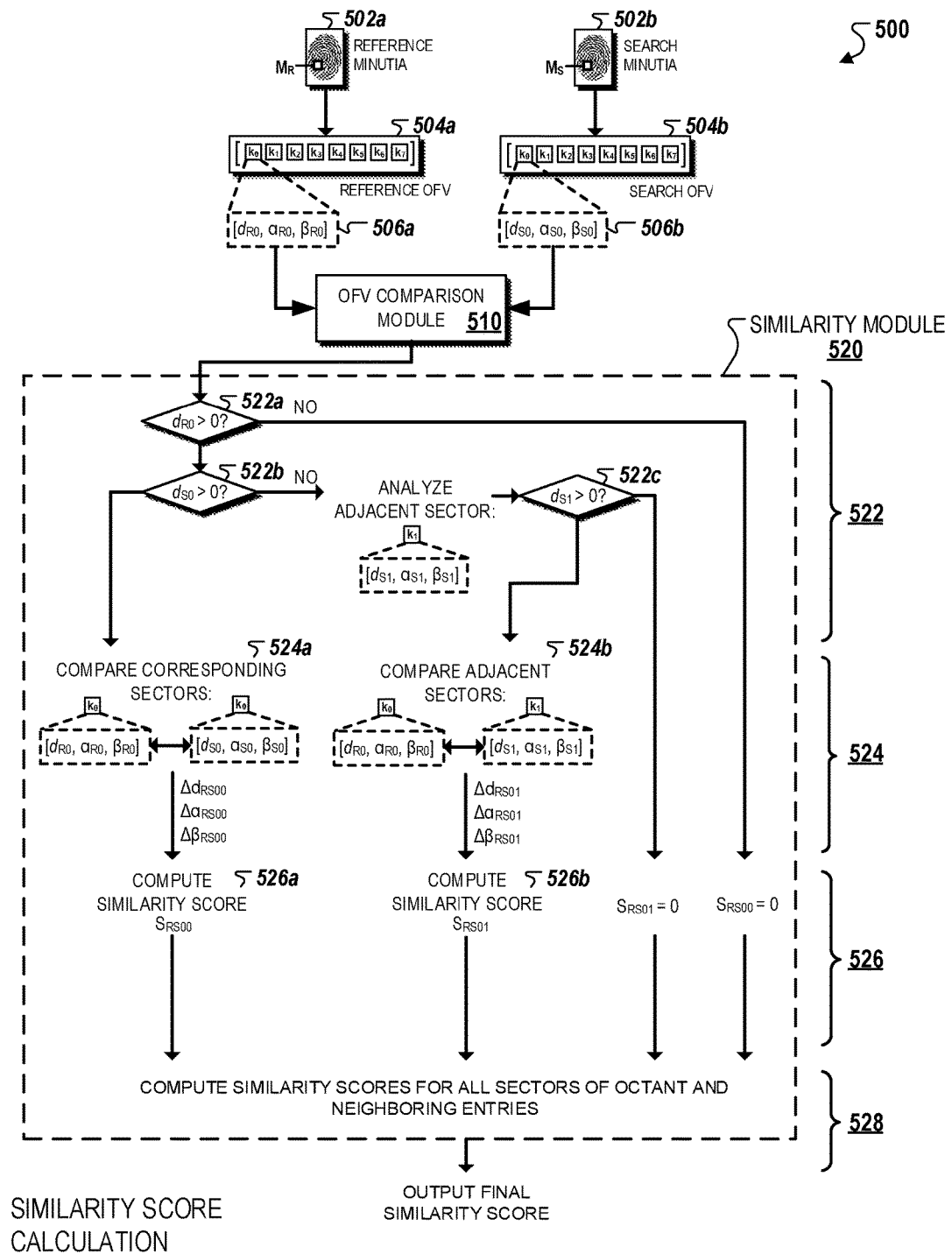
FIG. 5 is an exemplary process of calculating similarity between two minutiae.
Figure 6:
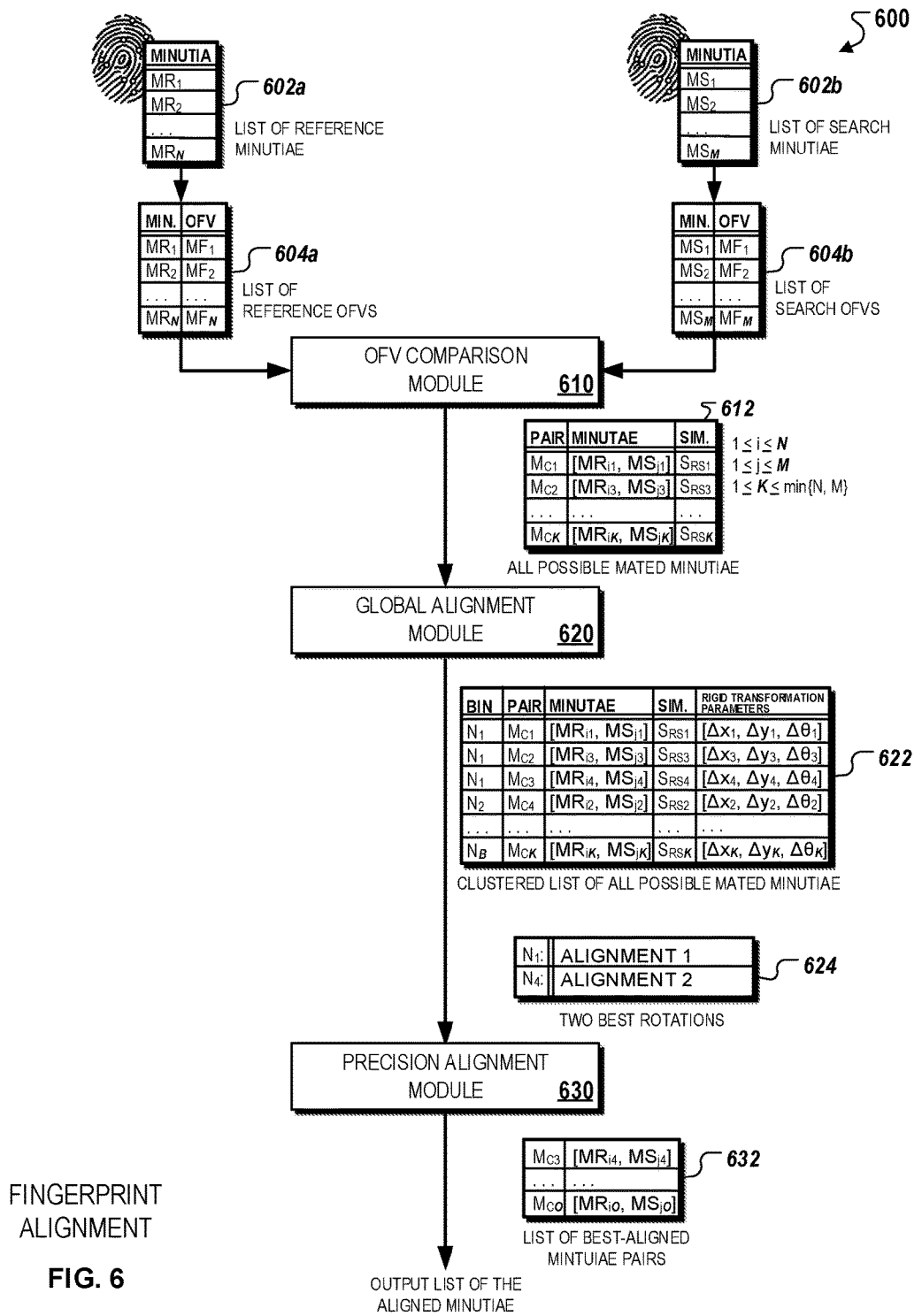
FIG. 6 is an exemplary alignment process for a pair of fingerprints.
Figure 7:
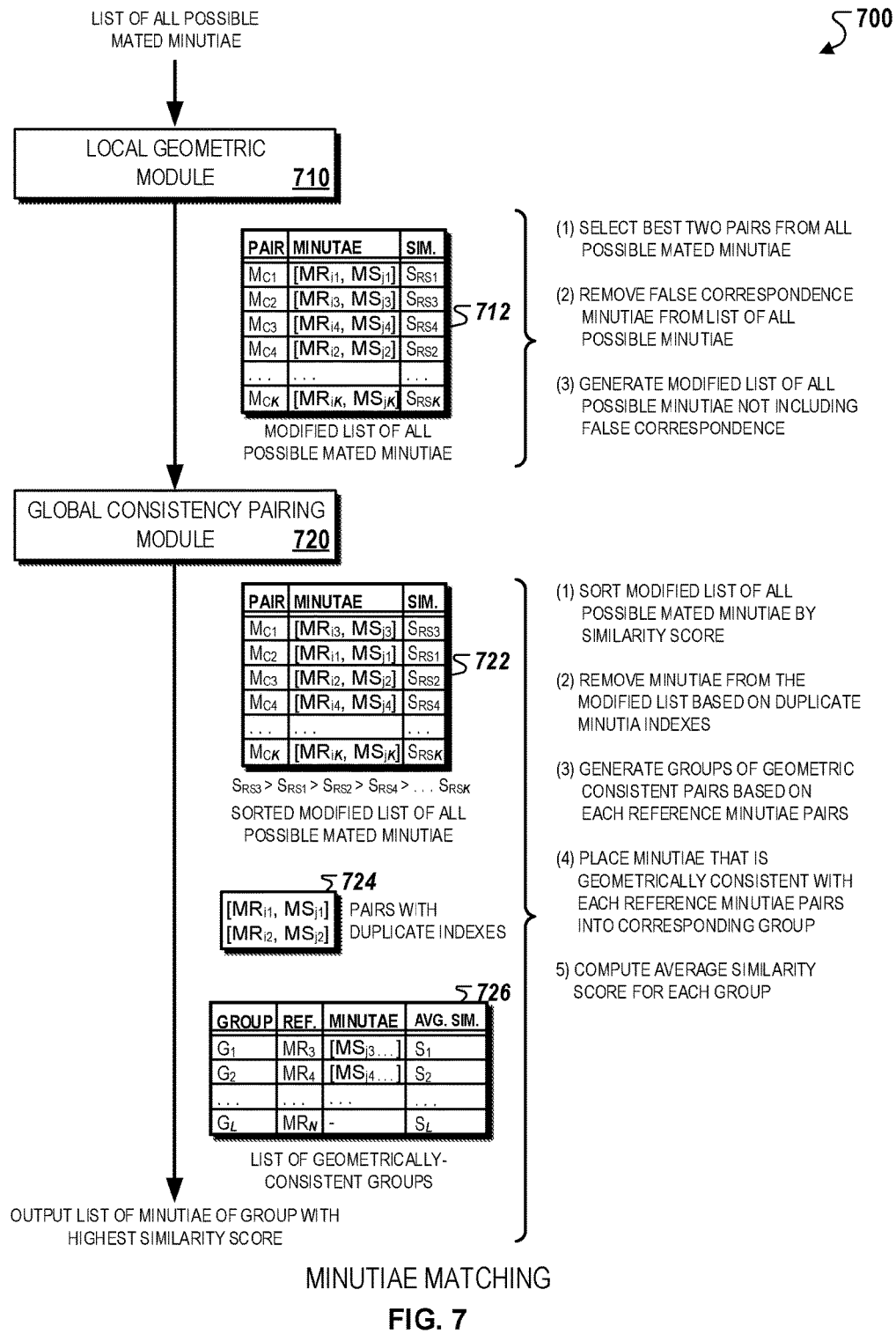
FIG. 7 is an exemplary minutiae matching process for a pair of fingerprints.

FIGS. 5-7 generally describe different processes that may be used to during fingerprint identification and matching procedures. For instance, FIG. 5 illustrates an exemplary process of calculating an individual similarity score between a reference minutia and a search minutia. FIG. 6 illustrates an exemplary alignment process between two fingerprints using extracted minutiae from the two fingerprints, and FIG. 7 illustrates an exemplary minutiae matching technique that may be employed after the alignment procedure represented in FIG. 7. As described with respect to FIG. 8, the processes represented in FIGS. 5-7 may be used in conjunction during an exemplary distorted fingerprint matching process.

Referring to FIG. 5, a similarity determination process 500 may be used to compute an individual similarity score between a reference minutia 502a from a reference fingerprint, and a search minutia 502b from a search fingerprint. A reference OFV 504a and a search OFV 504b may be generated for the reference minutia 502a and the search minutia 504b, respectively, using the techniques described with respect to FIG. 4. As shown, the search and reference OFVs 504a and 504b include individual octant sectors $k_0$ to $k_7$ as described as illustrated in FIG. 3. Each of the reference OFV 504a and the search OFV 504b may include parameters such as, for example, the Euclidian distance 230, the minimum rotation angle 240, and the minimum rotation angle 250 as described with respect to FIG. 2. As shown in FIG. 5, exemplary parameters 506a and 506b may represent the parameters for octant sector $k_0$ of the reference OFV 502a and the search OFV 502b, respectively.

The similarity score determination may be performed by an OFV comparison module 520, which may be a software module or component of the automatic fingerprint identification system 100. In general, the similarity score calculation includes four steps. Initially, the Euclidian distance values of a particular octant sector may be evaluated (522). Corresponding sectors between the reference OFV 504a and the similarity OFV 504b may then be compared (524). A similarity score between a particular octant sector within the reference OFV 504a and its corresponding octant sector in the search OFV 504b may then be computed (526). Finally, the similarity scores for the between other octant sectors of the reference OFV 504a and the search OFV 504b may then be computed and combined to generate the final similarity score between the reference OFV 504a and the search OFV 504b (528).

With respect to step 522, the similarity module 520 may initially determine if the Euclidian distance values within the parameters 506a and 506b are non-zero values. For instance, as shown in decision point 522a, the Euclidean distance associated with the octant sector of the reference OFV 504a, $d_{RO}$, is initially be evaluated. If this value is equal to zero, then the similarity score for the octant sector $k_0$ is set to zero. Alternatively, if the value of $d_{RO}$ is greater than zero, then the similarity module 520 proceeds to decision point 522b, where the Euclidean distance associated with the octant sector of the reference OFV 504a, $d_{SO}$, is evaluated. If the value of $d_{SO}$ is not greater than zero, then the OFV similarity module 520 evaluates the value of the Euclidean distance $d_{S1}$, which is included in an adjacent sector $k_1$ to the octant sector $k_0$ within the reference OFV 504b. Although FIG. 5 represents only one of the adjacent sectors being selected, because each octant sector includes two adjacent octant sectors as shown in FIG. 3, in other implementations, octant sector $k_7$ may also be evaluated. If the value of the Euclidean distance within the adjacent octant sector is not greater than zero, then the similarity module 520 sets the value of individual similarity score $S_{RS01}$, between the octant sector $k_0$ of the reference OFV 504a and the octant sector $k_1$ of the reference OFV 504b, to zero.

Alternatively, if the either the value of Euclidean distance $d_{RO}$ within the octant sector $k_0$ of the reference OFV 504a, or the Euclidean distance $d_{S1}$ within the adjacent octant sector $k_1$ of the search OFV 504b is determined to be a non-zero value within the decision points 522b and 522c, respectively, then the similarity module proceeds to step 524.

In some instances, a particular octant vector may include zero corresponding minutiae within the search OFV 504b due to localized distortions within the search fingerprint. In such instances, where the corresponding minutiae may have drifted to an adjacent octant sector, the similarity module 520 may alternatively compare the features of the octant vector of the reference OFV 504a to a corresponding adjacent octant vector of the search OFV 504b as shown in step 524b.

If proceeding through decision point 522b, the similarity module 520 may proceed to step 524a where the corresponding octant sectors between the reference OFV 504a and the search OFV 504b are compared. If proceeding through decision point 522c, the similarity module 620 may proceed to step 524b where the octant sector $k_0$ of the reference OFV 504a is compared to the corresponding adjacent octant sector $k_1$ the search OFV 504b. During either process, the similarity module 520 may compute the difference between the parameters that are included within each octant sector of the respective OFVs. For instance, as shown, the difference between the Euclidean distances 230, $\Delta d$, the difference between the minimum rotation angles 240, $\Delta\alpha$, and the difference between the minimum rotation angles 250, $\Delta\beta$, may be computed. Since these parameters represent geometric relationships between pairs of minutiae, the differences between them represent distance and orientation differences between the reference and search minutiae with respect to particular octant sectors.

In some implementations, dynamic threshold values for the computed feature differences may be used to handle nonlinear distortions within the search fingerprint in order to find mated minutiae between the search and reference fingerprint. For instance, the values of the dynamic thresholds may be adjusted to larger or smaller values to adjust the sensitivity of the mated minutiae determination process. For example, if the value of the threshold for the Euclidean distance is set to a higher value, than more minutiae within a particular octant sector may be determined to be a neighboring minutia to a reference minutiae based on the distance being lower than the threshold value. Likewise, if the threshold is set to a lower value, then a smaller number of minutiae within the particular octant sector may be determined to be neighboring minutia based on the distance to the reference minutia being greater than the threshold value.

After either comparing the corresponding octant sectors in step 524a or comparing the corresponding adjacent octant sectors in step 524b, the similarity module 520 may then compute an individual similarity score between the respective octant sectors in steps 526a and 526b, respectively. For instance, the similarity score may be computed based on the values of the feature differences as computed in steps 524a and 524b. For instance, the similarity score may represent the feature differences and indicate minutiae that are likely to be distorted minutiae. For example, if the feature differences between a reference minutiae and corresponding search minutia within a particular octant sector are close the dynamic threshold values, the similarity module 520 may identify the corresponding search minutia as a distortion candidate.

After computing the similarity score for either the corresponding octant sectors, or the corresponding adjacent sectors in steps 526a and 526b, respectively, the similarity module 520 may repeat the steps 522-526 for all of the other octant sectors included within the reference OFV 504a and the search OFV 504b. For instance, the similarity module 520 may iteratively execute the steps 522-526 until the similarity scores between each corresponding octant sector and each corresponding adjacent octant sector are computed for the reference OFV 504a and the search OFV 504b.

The similarity module may then combine the respective similarity scores for each corresponding octant sectors and/or the corresponding adjacent octant sectors to generate a final similarity score between the reference minutia and the corresponding search minutia. This final similarity score is also referred to as the "individual similarity score" between corresponding minutiae within the search and reference fingerprints as described in other sections of this specification. The individual similarity score indicates a strength of the local matching of the corresponding OFV.

In some implementations, the particular aggregation technique used by the similarity module 522 to generate the final similarity score (or the "individual similarity score") may vary. For example, in some instances, the final similarity score may be computed based on adding the values of the similarity scores for the corresponding octant sectors and the corresponding adjacent octant sectors, and normalizing the sum by a sum of a total number of possible mated minutiae for the reference minutia and a total of number of possible mated minutiae for the search minutia. In this regard, the final similarity score is weighted by considering the number of mated minutiae and the total number of possible mated minutiae.

FIG. 6 illustrates an exemplary alignment process 600 between a reference fingerprint and a search fingerprint. Briefly, the process 600 may initially compare a list of reference OFVs 604a associated with a list of reference minutiae 602a and a list of search OFVs 604b associated with a list of search minutiae 604b, and generate a list of all possible mated minutiae 612. A global alignment module 620 may then perform a global alignment procedure on the list of all possible mated minutia 612 to generate a clustered list of all possible mated minutiae 622, and determine two best alignment rotations 622 for the search fingerprint relative to the reference fingerprint. A precision alignment module may then use the two best rotations 624 perform a second alignment procedure to generate a list that includes the best-aligned pair 632 for the plurality of bins, which are provided as outputs of the alignment process.

As described previously with respect to FIG. 5, the OFVs of corresponding minutiae within the reference fingerprint and the search fingerprint may be compared by the OFV comparison module 610 to generate the list of all possible mated minutiae 612. As described, "mated minutiae" refer to a pair of minutiae that includes a particular reference minutia and a corresponding search minutia based at least on the OFV comparison performed by the OFV comparison module 610, and the value of the individual similarity score between the two respective OFVs of the reference and search minutiae. The individual similarity score indicates a strength of the local matching of the corresponding OFV. In addition, the list of all possible mated minutiae 612 includes all of the minutiae within the octant sectors that are identified as neighboring minutiae to a particular reference minutia and have a non-zero similarity score, although additional mated minutiae may exist with similarity score values equal to zero. Although as shown in the FIG., the list of all possible minutiae 612 includes one search minutia per reference minutia, in some instances, multiple mated minutiae may exist within the list of all possible minutiae 612 for a single reference minutia.

The global alignment module 620 performs a global alignment process on the list of all possible mated minutiae 612, which estimates a probable (or best rotation) alignment between the reference fingerprint and the search fingerprint based on comparing the angle offsets between the individual minutiae within the mated minutiae. For instance, the global alignment module 620 may initially compute an angle offset for each mated minutiae pair based on the individual similarity scores between a particular reference minutia and its corresponding search minutia.

Each of the mated minutiae within the list of all possible mated minutiae 612 may then be grouped into a historical bin that is associated with a particular angle offset range. For instance, two mated minutiae pairs within the list of all possible mated minutiae 612 may be grouped into the same historical bin if their respective individual similarity scores indicate a similar angular offset between the individual minutia within each mated minutiae pair. In some instances, the number of historical bins for the list of all possible mated minutiae 612 is used to estimate a fingerprint quality score for the search fingerprint. For example, if the quality of the search fingerprint is excellent, then the angular offset among each of the mated minutiae within the list of all possible mated minutiae 612 should be consistent, and majority of the mated minutiae will be grouped into a single historical bin. Alternatively, if the fingerprint quality is poor, then the number of historical bins would increase, representing significant variations between the angular offset values between the mated minutiae within the list of all possible mated minutiae 612.

In addition to grouping the mated minutiae into a particular historical bin, the global alignment module 620 may determine a set of rigid transformation parameters, which indicate geometric differences between the reference minutiae and the search minutiae with similar angular offsets. The rigid transformation parameters thus indicate a necessary rotation of the search fingerprint at particular locations, represented by the locations of the minutiae, in order to geometrically align the search fingerprint to the reference fingerprint. Since the rigid transformation parameters are computed for all possible mated minutiae, the necessary rotation represents a global alignment between the reference fingerprint and the search fingerprint. The global alignment module 620 may then generate a clustered list of all possible mated minutiae, which groups the mated minutiae by the historical bin based on the respective angle offsets, and includes a set of rigid transformation parameters. In some implementations, the histogram represented by the plurality of bins may be smoothened by a Gaussian function.

The global alignment module 620 may use the clustered list of all possible mated minutiae to determine two best rotations 624. For instance, the two best rotations 624 may be determined by using the rigid transformation parameters to calculate a set of alignment rotations for the search fingerprint using each historical bin as a reference point. Each alignment rotation may then be applied to the search fingerprint to generate a plurality of transformed search fingerprints that is individually mapped to each alignment rotation. For example, in some instances, the number of alignment rotations corresponds to the number of historical bins generated for the list of all possible mated minutiae 612. In such instances, the number of transformed search fingerprints generated corresponds to the number of historical bins included in the cluster list of all possible mated minutiae 622. Each set of transformed search fingerprints may then be compared to the reference fingerprint to determine the two best rotations 624. For example, as described more particularly with respect to FIG. 7, each transformed search fingerprint may be compared to the reference fingerprint using a minutiae matching technique to determine which particular alignment rotations generate the greatest number of correctly matched minutiae between a particular transformed search fingerprint and the reference fingerprint. The global alignment module 620 may then extract the two best alignment rotations 624, which are then used by the precision alignment module 630.

In some implementations, different matching constraints may be used with the minutiae matching techniques to determine the two best alignment rotations 624.

The precision alignment module 630 may then use the two best alignment rotations 624 to perform a precision alignment process that iteratively rotates individual minutiae within the search fingerprint around the two best alignment rotations 632 several times with small angle variations to obtain a more precise pairing between individual search minutiae and their corresponding reference minutiae. For example, in some, twelve rotations may be used with two degree angle variations. The minutiae that are associated with the precise pairing between the search fingerprint and the reference fingerprint are determined to be the list of best-aligned minutiae 632, which are provided for output by the process 600. The list of best-aligned minutiae 632 represent transformations of individual search minutiae within the search fingerprint that most closely pair with the corresponding reference minutiae of the reference fingerprint as a result of the global alignment and the precision alignment processes.

FIG. 7 illustrates an exemplary minutiae matching process 700. The minutiae matching process 700 may be performed after the fingerprint alignment process 600 as described in FIG. 6 to remove false correspondences included within a list of aligned minutiae that is outputted from alignment process. For instance, fingerprints from two fingers of an individual may share local structures, which can result in false correspondence minutiae between a search fingerprint of one finger and a reference fingerprint of another finger. To resolve this, the minutiae matching process 700 includes a two-stage pruning process to remove false correspondence minutiae pairs within a list of all possible mated minutiae.

Briefly, the process 700 may include a local geometric module 710 receiving a list of aligned minutiae 710, and generating a modified list of all possible minutiae 712 that does not include false correspondence minutiae. A global consistency pairing module may then sort the modified list of all possible minutiae 712 by values of the respective individual similarity scores to generate a sorted modified list of all possible minutiae 722. The global consistency pairing module 720 may remove minutiae pairs with duplicate indexes 724, and group the list of mated minutiae based on conducting a global geometric consistency evaluation to generate a list of geometrically consistent groups 726, which are then outputted with a top average similarity score from one of the geometrically consistent groups.

Initially, the local geometric module 710 may select the best-paired minutiae from the list of all possible mated minutiae. For instance, after aligned the search fingerprint and the reference fingerprint as described in FIG. 6, the local geometric module 710 may scan the list of all possible minutiae and identify the two minutiae pairs with the minimum orientation difference.

In some instances, the identification of the best-paired minutiae may additionally be subject to satisfying a set of constraints. For example, one constraint may be that the index of the first pair is different from that of the first pair. In other examples, the rigid transformation parameters of the two best-paired minutiae pairs may be compared to threshold values to ensure that the two identified pairs are geometrically consistent.

After identifying the two best-paired minutiae pairs, the local geometric module 710 may use the two best-paired minutiae pairs as reference pairs to remove other minutiae pairs from the list of all possible mated minutiae. In some instances, particular pairs may be removed if they satisfy one or more removal criteria based on the attributes of the two best paired minutiae pairs. For example, one constraint may be that if the minutiae index of a particular pair is the same as one of the best-paired minutiae pairs, then that particular pair may be identified as a duplicate within the list of all possible minutiae and removed as a false correspondence. In another example, a rotational constraint may be used to remove particular minutiae pairs that have a large orientation difference compared to the two best-paired minutiae pairs. In another example, distance constraints may be used to keep each particular minutiae pair within the list of all possible mated minutiae geometrically consistent with the two best-paired minutiae pairs. The updated list of minutiae pairs that is generated is the modified list of all possible mated minutiae 712.

After the modified list of all possible mated minutiae is generated, the global consistency pairing module 720 may perform a global consistency pairing operation on the modified list of all possible mated minutiae 722 to generate the list of geometrically-consistent groups 726 (or "globally aligned mated minutiae"). For instance, the global consistency pairing module 720 may initially sort the list modified list of all possible mated minutiae 712 by the similarity score, and then scan the list and remove particular minutiae pairs 724 that have minutiae indexes that are similar to the minutiae pairs with the highest similarity scores in the sorted modified list of all possible mated minutiae 722.

The global consistency pairing module 720 may then initialize a set of groups based on the number of reference minutiae included within the list. For instance, a group may be created for each reference minutia such that if there are multiple minutiae pairs within the list of sorted modified list of all possible minutiae 722 for a single reference minutiae, the multiple minutiae pairs are included in the same group. In some instances, the global consistency pairing module 720 may additionally check the geometric consistency between each of the minutiae pairs within the same group and remove minutiae pairs that are determined not be geometrically consistent. The global consistency pairing module 720 may then compute an average similarity score for each group based on aggregating the individual similarity scores associated with each of the minutiae pairs within the group.

After computing the average similarity scores for each group, the global consistency pairing module 720 may then compare the average similarity scores between each group and select the group that has the highest average similarity score and then provide the list of minutiae that are included within the group for output of the process 700 and include the top average similarity score.

As describe above, FIGS. 5-7 illustrate processes that are utilized by the automatic fingerprint identification system to process, analyze, and match individual minutiae from a search fingerprint to a reference fingerprint. As described in FIG. 8, these processes may be utilized within a matching operation for a distorted fingerprint to compute a final similarity score that indicates a confidence of a fingerprint match between a search fingerprint and a reference fingerprint.

Distorted Fingerprint Matching

Figure 8:
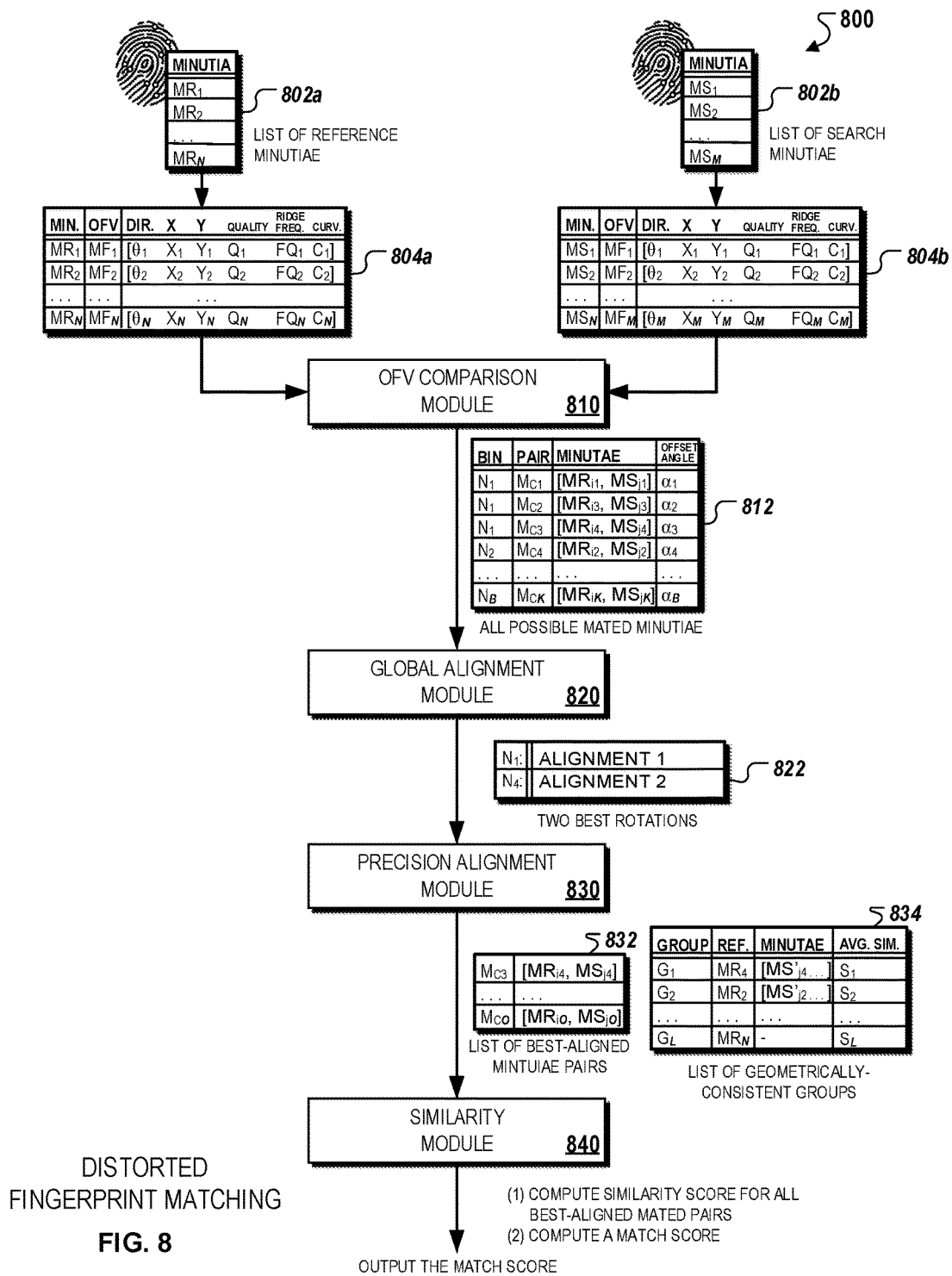
FIG. 8 is an exemplary process of distorted fingerprint matching.

FIG. 8 illustrates an exemplary distorted fingerprint matching operation 800. The fingerprint matching operation 800 may be used to match a search fingerprint that may be nonlinearly distorted or may exhibit other types of errors that would like to cause inaccurate results using contemporary fingerprint matching technologies. The fingerprint matching operation 800 employs the principles and techniques described previously in FIGS. 1-7 to reduce errors resulting from distortion.

The fingerprint matching operation 800 may include generating a list of invariant and distortion-tolerant reference OFVs 802a for a list of reference minutiae 802a, and a list of invariant and distortion-toleration search OFVs 804b for a list of search minutiae 802a. For instance, as described in FIG. 4, the list of reference OFVs 804a and the list of search OFVs 804b may be generated by comparing each of the list of search minutiae 802a and the list of reference 802b to its neighboring minutiae within a set of octant sectors.

An OFV comparison module may compare the respective search and reference OFVs 804a and 804b, respectively, and generate a list of all possible mated minutiae 812. For instance, as described in FIGS. 6-7, the list of all possible mated minutiae may include individual pairs of search minutiae and corresponding reference minutiae based on comparing the features included within the respective reference OFVs included in the list of reference OFVs 804a and the respective search OFVs included in the list of search OFVs 804b. The list of reference OFVs 804a and the list of search OFVs 804b may include a set of absolute features that improve fingerprint matching for distorted fingerprint matching. For instance, the absolute features may include a direction, x-y coordinates, a quality score, a ridge frequency, and a curvature. In some implementations, the absolute features are included into the calculation of individual similarity scores as described in FIG. 5 as weights to factor in impacts of distortions on the search fingerprint.

A global alignment module 820 may cluster all of the list of all possible mated minutiae pairs into a plurality of histogram bins, and subsequently perform a first global alignment procedure on each historical bin to determine two best rotations 822 for the list of all possible mated minutiae 812. For instance, as described in FIG. 6, the global alignment module 820 may initially cluster the list of all possible mated minutiae 812 based on a range of rotation angles, determine the two best rotations 822 based on comparing the each of the transformed search fingerprint under each rotation angle to the reference fingerprint.

A precision alignment module 830 may use the two best rotations 822 to identify a list of best-aligned minutiae 832 within the list of all possible mated minutiae. The precision alignment module 830 may also perform a two-step pruning procedure to generate a list of geometrically-consistent groups 834. For instance, as described in FIG. 7, the two-step pruning procedure may include performing a local geometric pairing operation by removing false correspondence minutiae from the list of all possible mated minutiae.

A similarity module 840 may compute an individual similarity score for each mated minutiae pair within the list of geometrically-consistent groups 834. For instance, as described in FIG. 5, the individual similarity score may computed based on aggregating single similarity scores between individual octant sectors of the respective OFVs of the search and reference minutia within a mated minutiae pair. The similarity score calculation may additionally include wrights based on the absolute features included within the respective OFVs for the search and reference minutiae included within the list of all possible mated minutiae. The list of individual similarity scores for all mated minutiae may then be aggregated to compute a final similarity score between the reference fingerprint and the search fingerprint. In some instances, the final similarity score is computed based on selecting the maximum value of the individual similarity score for all of the mated minutiae.

In some implementations, a distortion flag may additionally be set after the final similarity score is computed based on the number of mated minutiae that are identified as distortion minutiae. In some instances, the number of distorted minutiae may be compared to a threshold value to determine whether the final similarity score may be severely distorted. In such instances, a distortion notification may be provided to an end-user of the automatic fingerprint identification system 100 indicating that the final similarity score may be distorted and requires manual verification or re-enrollment of either the search or reference fingerprints.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method performed by one or more computers, the method comprising:
receiving (i) search octant feature vectors associated with search minutiae extracted from a search fingerprint, and (ii) reference octant feature vectors associated with reference minutiae extracted from a reference fingerprint;
for each search minutia included in the search minutiae:
computing a first score that represents a feature difference between (i) a search octant feature vector that includes a particular search minutia and (ii) reference octant feature vectors that each include a reference minutia included in a first set of reference minutiae that are identified as being closest neighboring minutiae to the search minutia;
computing a second score that represents a ratio of a number of paired mated minutiae included in the first set of reference minutiae relative to a number of paired unmated minutiae included in the first set of reference minutiae;
determining, based on the first and second scores, a geometrically aligned region between the search fingerprint and the reference fingerprint;
determining a set of globally aligned mated minutia pairs based on the geometrically aligned region between the search fingerprint and the reference fingerprint;

for each mated minutia pair included in the set of globally aligned mated minutia pairs:
  computing a third score that represents a feature difference between (i) a search octant feature vector that includes a particular search minutia and (ii) reference octant feature vectors that each include a reference minutia included in a second set of reference minutiae that are identified as being closest neighboring minutiae to the search minutia in the geometrically aligned region;
  computing a fourth score that represents a ratio of a number of paired mated minutiae in the geometrically aligned region included in the second set of reference minutiae relative to a number of paired unmated minutiae in the geometrically aligned region included in the second set of reference minutiae;
computing a match similarity score between the search fingerprint and the reference fingerprint based at least on combining the first score, the second score, the third score, and the fourth score; and
providing the match similarity score for output to an automatic fingerprint identification system.

2. The method of claim 1, wherein determining the geometrically aligned region between the search fingerprint and the reference fingerprint comprises:
  computing, for each search minutia included in the search minutiae, a local similarity score based at least on combining the first score and the second score;
  determining a rotation angle between the search fingerprint and the reference fingerprint based on the local similarity score.

3. The method of claim 2, further comprising:
  determining, based on the local similarity scores for the search minutiae, a set of local closest matched minutia pairs;
  computing sets of rotation parameters based on the set of local closest matched minutia pairs.

4. The method of claim 3, wherein computing the sets of rotation parameters comprises identifying angles corresponding to a set of top bins of an angle offset histogram of the set of local closest matched minutiae pairs.

5. The method of claim 1, wherein each mated minutia pair included in the set of globally aligned mated minutia pairs comprises a search minutia and a corresponding reference minutiae included in the geometrically aligned region that is determined to have geometrically consistent features to the search minutia.

6. The method of claim 1, wherein:
the search fingerprint is a distorted fingerprint; and
the match similarity score is used to determine a fingerprint match between the search fingerprint and the reference fingerprint.

7. The method of claim 1, further comprising:
comparing, for each mated minutia pair included in the set of globally aligned mated minutia pairs, features of a search minutia of a mated minutia pair and features of a corresponding reference minutia of the mated minutia pair;
based on comparing the features of the search minutia of the mated minutia pair and the features of the corresponding reference minutia of the mated minutia pair:
  identifying a set of rotation parameters for the geometrically aligned region, and
  identifying a set of translation parameters for the geometrically aligned region; and
aligning the search minutiae to the reference minutiae included in the set of globally aligned mated minutia pairs based at least on the set of rotation parameters and the set of translation parameters.

8. A system comprising:
one or more processors; and
one or more storage devices storing instructions that, when executed by the one or more processors, cause the one or more processors to perform operations comprising:
  receiving (i) search octant feature vectors associated with search minutiae extracted from a search fingerprint, and (ii) reference octant feature vectors associated with reference minutiae extracted from a reference fingerprint;
  for each search minutia included in the search minutiae:
    computing a first score that represents a feature difference between (i) a search octant feature vector that includes a particular search minutia and (ii) reference octant feature vectors that each include a reference minutia included in a first set of reference minutiae that are identified as being closest neighboring minutiae to the search minutia;
    computing a second score that represents a ratio of a number of paired mated minutiae included in the first set of reference minutiae relative to a number of paired unmated minutiae included in the first set of reference minutiae;
  determining, based on the first and second scores, a geometrically aligned region between the search fingerprint and the reference fingerprint;
  determining a set of globally aligned mated minutia pairs based on the geometrically aligned region between the search fingerprint and the reference fingerprint;
  for each mated minutia pair included in the set of globally aligned mated minutia pairs:
    computing a third score that represents a feature difference between (i) a search octant feature vector that includes a particular search minutia and (ii) reference octant feature vectors that each include a reference minutia included in a second set of reference minutiae that are identified as being closest neighboring minutiae to the search minutia in the geometrically aligned region;
    computing a fourth score that represents a ratio of a number of paired mated minutiae in the geometrically aligned region included in the second set of reference minutiae relative to a number of paired unmated minutiae in the geometrically aligned region included in the second set of reference minutiae;
  computing a match similarity score between the search fingerprint and the reference fingerprint based at least on combining the first score, the second score, the third score, and the fourth score; and
  providing the match similarity score for output to an automatic fingerprint identification system.

9. The system of claim 8, wherein determining the geometrically aligned region between the search fingerprint and the reference fingerprint comprises:
  computing, for each search minutia included in the search minutiae, a local similarity score based at least on combining the first score and the second score;

determining a rotation angle between the search fingerprint and the reference fingerprint based on the local similarity score.

10. The system of claim 9, wherein the operations further comprise:
determining, based on the local similarity scores for the search minutiae, a set of local closest matched minutia pairs;
computing sets of rotation parameters based on the set of local closest matched minutia pairs.

11. The system of claim 10, wherein computing the sets of rotation parameters comprises identifying angles corresponding to a set of top bins of an angle offset histogram of the set of local closest matched minutiae pairs.

12. The system of claim 8, wherein each mated minutia pair included in the set of globally aligned mated minutia pairs comprises a search minutia and a corresponding reference minutiae included in the geometrically aligned region that is determined to have geometrically consistent features to the search minutia.

13. The system of claim 8, wherein:
the search fingerprint is a distorted fingerprint; and
the match similarity score is used to determine a fingerprint match between the search fingerprint and the reference fingerprint.

14. The system of claim 8, wherein the operations further comprise:
comparing, for each mated minutia pair included in the set of globally aligned mated minutia pairs, features of a search minutia of a mated minutia pair and features of a corresponding reference minutia of the mated minutia pair;
based on comparing the features of the search minutia of the mated minutia pair and the features of the corresponding reference minutia of the mated minutia pair:
identifying a set of rotation parameters for the geometrically aligned region, and
identifying a set of translation parameters for the geometrically aligned region; and
aligning the search minutiae to the reference minutiae included in the set of globally aligned mated minutia pairs based at least on the set of rotation parameters and the set of translation parameters.

15. A non-transitory machine-readable data storage device that stores instructions that, when executed by data processing apparatus, cause the data processing apparatus to perform operations comprising:
receiving (i) search octant feature vectors associated with search minutiae extracted from a search fingerprint, and (ii) reference octant feature vectors associated with reference minutiae extracted from a reference fingerprint;
for each search minutia included in the search minutiae:
computing a first score that represents a feature difference between (i) a search octant feature vector that includes a particular search minutia and (ii) reference octant feature vectors that each include a reference minutia included in a first set of reference minutiae that are identified as being closest neighboring minutiae to the search minutia;
computing a second score that represents a ratio of a number of paired mated minutiae included in the first set of reference minutiae relative to a number of paired unmated minutiae included in the first set of reference minutiae;
determining, based on the first and second scores, a geometrically aligned region between the search fingerprint and the reference fingerprint;
determining a set of globally aligned mated minutia pairs based on the geometrically aligned region between the search fingerprint and the reference fingerprint;
for each mated minutia pair included in the set of globally aligned mated minutia pairs:
computing a third score that represents a feature difference between (i) a search octant feature vector that includes a particular search minutia and (ii) reference octant feature vectors that each include a reference minutia included in a second set of reference minutiae that are identified as being closest neighboring minutiae to the search minutia in the geometrically aligned region;
computing a fourth score that represents a ratio of a number of paired mated minutiae in the geometrically aligned region included in the second set of reference minutiae relative to a number of paired unmated minutiae in the geometrically aligned region included in the second set of reference minutiae;
computing a match similarity score between the search fingerprint and the reference fingerprint based at least on combining the first score, the second score, the third score, and the fourth score; and
providing the match similarity score for output to an automatic fingerprint identification system.

16. The device of claim 15, wherein determining the geometrically aligned region between the search fingerprint and the reference fingerprint comprises:
computing, for each search minutia included in the search minutiae, a local similarity score based at least on combining the first score and the second score;
determining a rotation angle between the search fingerprint and the reference fingerprint based on the local similarity score.

17. The device of claim 16, wherein the operations further comprise:
determining, based on the local similarity scores for the search minutiae, a set of local closest matched minutia pairs;
computing sets of rotation parameters based on the set of local closest matched minutia pairs.

18. The device of claim 17, wherein computing the sets of rotation parameters comprises identifying angles corresponding to a set of top bins of an angle offset histogram of the set of local closest matched minutiae pairs.

19. The device of claim 15, wherein each mated minutia pair included in the set of globally aligned mated minutia pairs comprises a search minutia and a corresponding reference minutiae included in the geometrically aligned region that is determined to have geometrically consistent features to the search minutia.

20. The device of claim 15, wherein:
the search fingerprint is a distorted fingerprint; and
the match similarity score is used to determine a fingerprint match between the search fingerprint and the reference fingerprint.

* * * * *